United States Patent
Davis

(10) Patent No.: US 6,279,154 B1
(45) Date of Patent: Aug. 21, 2001

(54) APPARATUS AND METHOD FOR AN INSTALL SYSTEM FOR THIRD PARTY APPLICATIONS

(75) Inventor: Kenneth P. Davis, Brighton, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/170,692

(22) Filed: Oct. 13, 1998

(51) Int. Cl.[7] .................................................. G06F 9/445
(52) U.S. Cl. ...................................................... 717/11
(58) Field of Search ................................ 717/11; 713/1, 713/2, 100

(56) References Cited

U.S. PATENT DOCUMENTS

| | | | |
|---|---|---|---|
| 5,671,420 | * 9/1997 | Bell et al. ............................. | 395/712 |
| 5,950,010 | * 9/1999 | Hesse et al. .......................... | 395/712 |
| 5,953,532 | * 9/1999 | Lochbaum ............................ | 395/712 |
| 6,006,035 | * 12/1999 | Nabahi ................................. | 395/712 |

OTHER PUBLICATIONS

Ellerin, "The wonders and wizards of Windows instalation utilities", E–Media Professional, Oct. 1997, pp. 78–90.*
Muckian, "Windows: Calling it awkward would be kind", Computerworld, Feb. 1993, p. 33.*
Ruley, "Upgrading to CE 2.0", Windows Magazine, Dec. 1997, pp. 309–312.*
O'Brien, "Installations go smoothly with pricey tool", Infoworld, May 1997, p. 68C.*
Levi, "Make Win95 even more powerful", Accounting Technology, Jul. 1996, pp. 47–52.*
No Author, "IBM Suite for Windows NT : Getting started", International Business MAchines Corporation, Apr. 1998, pp. 1–17.*

* cited by examiner

Primary Examiner—Kakali Chaki

(57) ABSTRACT

Apparatus and method for implementation of an install system that provides for typical and custom installation and configuration of third party applications. The install system allows the user to choose between a typical or custom installation of third party applications. In typical installation, the install system creates a list of components to be installed. In the case of a custom installation, the install system collects and displays to the user all the parameters for the installation of the third party application. This allows the user to select those components from the component listing and creates a list of components to be installed. The install system also provides information to the user about each component available to be installed during the third party application installation process. This information provides the user with the ability to make an important decision as to whether or not to include particular components in a custom installation process.

19 Claims, 7 Drawing Sheets

APPARATUS AND METHOD FOR AN INSTALL SYSTEM FOR THIRD PARTY APPLICATIONS

BACKGROUND OF THE INVENTION

1. Field of the Invention

The present invention generally relates to an apparatus and method for allowing a user to choose between typical and custom installation of third party application software packages on a computer system

2. Description of Related Art

Currently, most software packages for use in computer systems include an installation program, with the function to install specific vendor programs either on a storage medium or in memory. The installation program might be used to guide a user through the complex procedure of setting up an application for a particular combination of machine and accessories. Installation programs are necessary for copy protected applications which cannot be copied by normal system commands.

Typically, each third party software application has its own install system or process for installing the application software. This creates a problem of requiring users to install third party software applications individually on the user's computer system. When installing all third party applications individually via different installation processes, the user can be confused as to what third party software has been installed and what third party software has not been installed. Utilization of the third party application installation process generally requires the users to know something about each of the applications that they are installing without any indication of the nature of the application's function other than the title.

Heretofore, install systems have lacked the ability to allow user's to install all third party applications utilizing a single install system. The single install system would provide a common interface for use for the installation of third party software and would allow the users to customize their configuration of third party applications being installed.

SUMMARY OF THE INVENTION

The present invention is generally directed to an apparatus and method for implementation of an install system that provides for typical and custom installation and configuration of third party applications.

In the preferred embodiment, the install system allows the user to choose whether or not an installation to be performed is a typical or custom installation. If a typical installation is selected, the install system first opens the configuration file of the third party application to be installed. Next, the install system creates a list of components to be installed and proceeds with the installation of the components on the component list. This provides a common interface for use for the installation of third party software and would allow the users to customize their configuration of third party applications being installed.

In an alternative embodiment, the install system also makes it possible to determine if there is enough available disk space for installation, prior to starting the actual installation of the components on the component list. This allows the user to save time if there is not enough space for installing the third party applications before starting the actual installation system. This also increases the ability to successfully install the third party application.

In another alternative embodiment, the install system also allows custom installations of third party software to be selected. In the case of a custom installation, the install system first collects all the parameters for the installation of the third party application and displays the component list to the user. This allows the user to select only those components from the component list that are to be installed. From the components selected from the configuration file, the install system creates a list of components to be installed in the custom installation procedure, and proceeds with the installation.

In yet another alternative embodiment, the install system also makes it possible to provide information to the user about each component available to be installed during the third party application installation process. The install system can provide information for each component including the component title, description of the component, the amount of space required for the component, application space i.e., memory space required, and the like. This information provides to the user the capability to make an important decision as to whether or not to include particular components in a custom installation process.

In both the typical/custom installations and component description display, the install system works in conjunction with the component list to identify which components are to be installed in the installation process or displayed.

BRIEF DESCRIPTION OF THE DRAWINGS

The accompanying drawings incorporated in and forming a part of the specification illustrate several aspects of the present invention, and together with the description, serve to explain the principles of the invention. The elements of the drawings are not necessarily to scale relative to each other, emphasis instead being placed upon clearly illustrating he principles of the invention. In the drawings.

DETAILED DESCRIPTION OF THE PREFERRED EMBODIMENT

Figure 1:
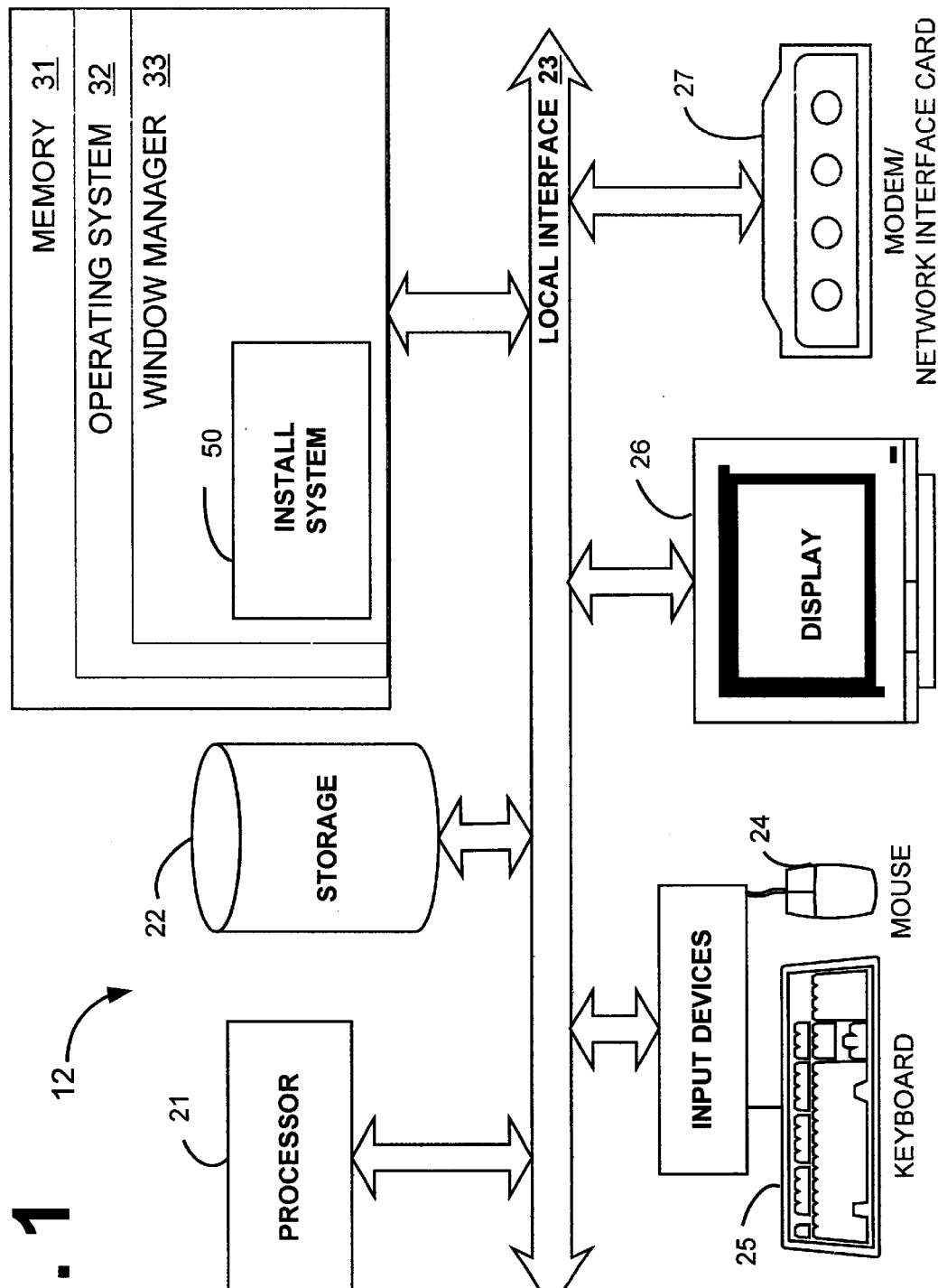
FIG. 1 is a system diagram of the user system showing the install system utilized by the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

As illustrated in FIG. 1, client systems 12 generally comprise a processor 21, storage devices 22, and memory 31 with an operating system 32 and window manager 33. The processor 21 accepts data from memory 31 and storage devices 22 over the local interface or bus 23. Direction from the user can be signaled by using the input devices mouse 24 and keyboard 25. The actions input and result output are displayed on the display terminal 26.

The first embodiment of the present invention involves the install system 50. The install system 50 is the software program that interacts with the processor 21, storage device 22, and the program residing in memory 31, to install the requested data and functionality requested by the client user from an installation medium, such as but not limited to CD-ROM, disk, diskette, network connection 27 or the like. The install system 50 will be described hereafter in detail with regard to FIGS. 2, 3, 4 and 5.

Figure 2:
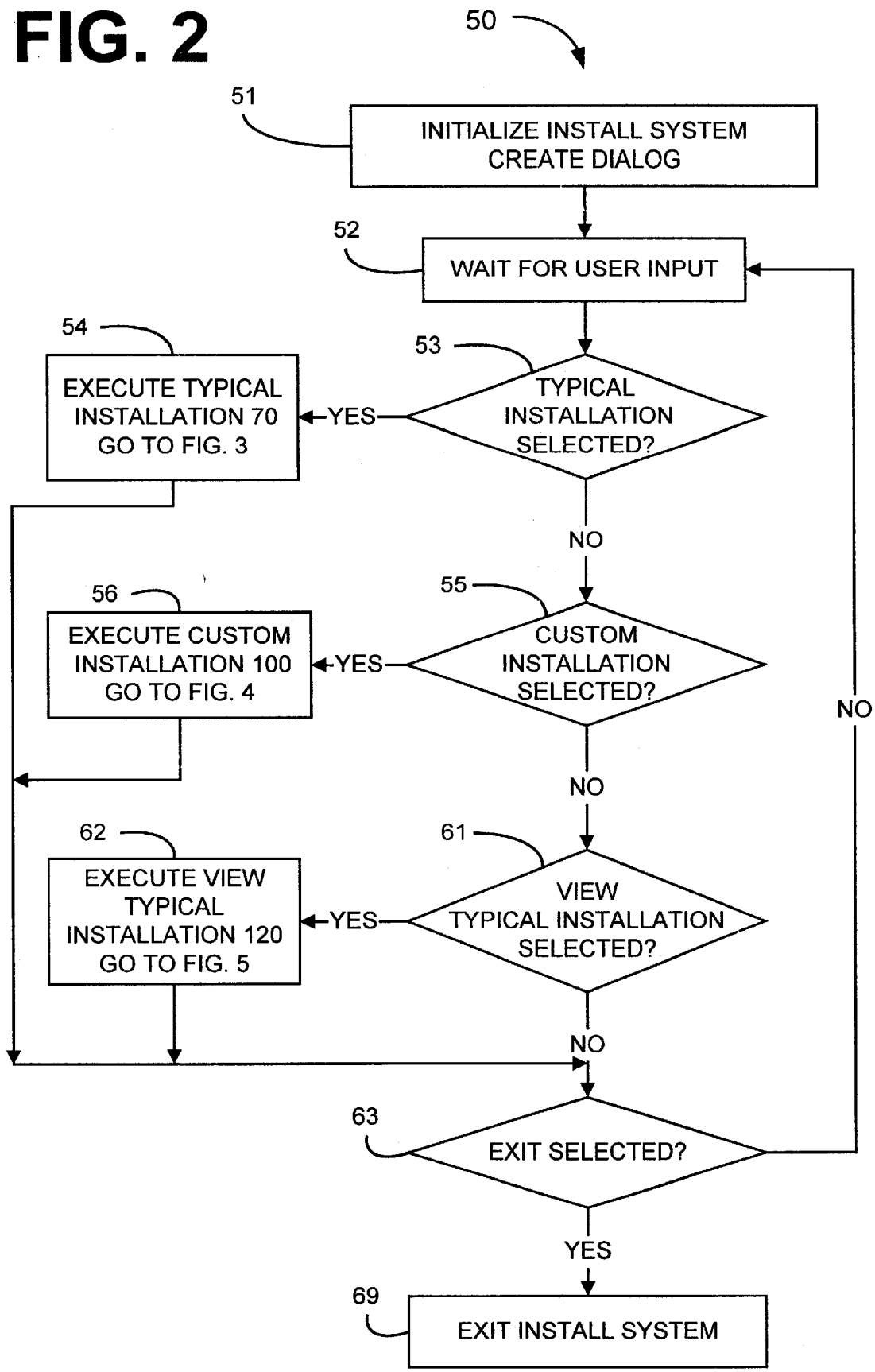
FIG. 2 is a flow chart of the install system of the present invention, as shown in FIG. 1.

Illustrated in FIG. 2 is the flow chart for the install system 50. First, the install system 50 is initialized at step 51. At initialization, an install system creates a dialog for user input. Next, the install system 50 waits for user input at step 52. Once user input is detected, install system 50 checks to determine whether the user has selected a typical installation at step 53. If a typical installation has been selected, the install system 50 then jumps to the typical installation process at step 54, herein defined with regard to FIG. 3.

If the user has not selected a typical installation, then the install system 50 checks if a custom installation has been selected at step 55. If custom installation has been selected, the install system 50 then jumps to the custom installation process at step 56, herein defined with regard to FIG. 4.

If the user has not selected a custom installation, then the install system 50 checks to determine whether a typical installation review has been selected at step 61. If a typical installation review has been selected, then the install system 50 proceeds to provide review of a typical installation at step 62, herein defined in detail with regard to FIG. 5.

If a typical installation review has not been selected, then the install system 50 checks to determine whether the user has selected to exit at step 63. If the user has not requested the exiting of the install system 50, then the install system 50 loops back and repeats the wait for user input at step 52 If the user has requested an exit from the install system, then the install system process is exited at step 69.

Figure 3:
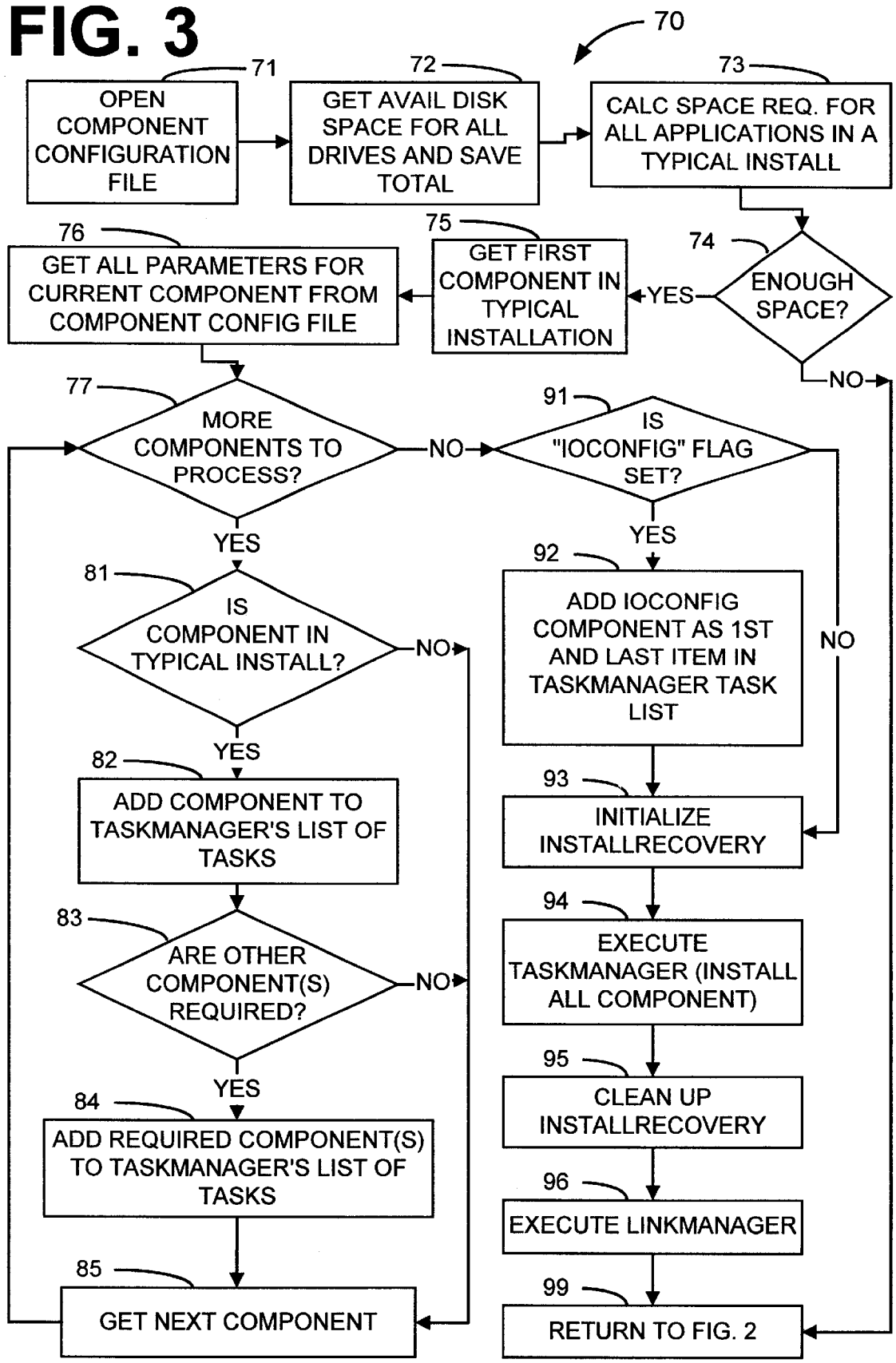
FIG. 3 is a flow chart of the of the typical installation process performed by the install system of the present invention, as shown in FIG. 1.

Illustrated in FIG. 3 is the flow diagram of the typical installation procedure 70 for the install system 50 referenced in FIG. 2. The typical installation procedure 70 first opens the third party application's component configuration file at step 71. Next, the typical installation procedure 70 retrieves the figures for all available disk space from all drives on the computer system 12 and saves the total amount of available disk space at step 72.

The typical installation procedure 70 next calculates the space required for all the third party applications utilizing the typical install process at step 73. In the preferred embodiment, the typical installation procedure 70 utilizes the components listed in the configuration file to perform the calculation of all space required for the typical installation.

The typical installation procedure 70 then uses the total amount of available disk space figure acquired at step 72 and the calculated space required for installation at step 73 to determine if sufficient storage space is available for the third party applications components to be installed at step 74. The typical installation procedure 70 displays a message if the total amount of available disk space is less than the space required for all the third party applications' plurality of components to be installed and jumps to step 99 to return to FIG. 2.

If it is determined at step 74 that the total amount of available disk space is more than the space required, the typical installation procedure 70 retrieves the first component in a typical installation of a third party application at step 75. The first component is identified in the component configuration file (not shown). The typical installation procedure 70 then acquires all parameters for the current component from the component's listing in the configuration file at step 76.

Next, the typical installation procedure 70 determines whether the component configuration file path has more components to process (i.e., is path empty?) at step 77. If there are more components to process, then the typical installation procedure 70 determines whether the next component is included in a typical installation at step 81.

If the test at step 81 determines that the current component is not included in a typical installation, then the typical installation procedure 70 proceeds to step 85 to get the next component.

If the current component is a component included in a typical installation, then the typical installation procedure 70 adds the current component to the task manager's list of tasks to be performed at step 82.

After adding the current component at step 82, the typical installation procedure 70 determines whether the current component requires the installation of a mandatory component(s) for operation. In the preferred embodiment, the typical installation procedure 70 determines whether a mandatory component flag is set. If the current component does not require the installation of a mandatory component(s) for operation, then the typical installation procedure 70 proceeds to step 85 to acquire the next component. If the current component requires the installation of a mandatory component(s) for operation, then the typical installation procedure 70 adds the mandatory component(s) to the task manager's list of tasks to be performed at step 84.

The typical installation procedure 70 acquires the next component at step 85, makes the next component the current component and loops to step 77 to repeat the previously mentioned steps.

If the typical installation procedure 70 check at step 77 determines that the component configuration file path has no more components to process (i.e. the current components path is empty), then the typical installation procedure 70 determines whether the input/output (I/O) configuration flag is set for the current component at step 91. If the I/O configuration flag is set, then the typical installation procedure 70 adds the I/O configuration component as the first and last item in the task manager's task list at step 92.

The I/O configuration component is an application that is added to the task manager task list when installing software specifying the user system 12 includes specific hardware. In the preferred embodiment, the I/O configuration application checks the user systems for a suitable I/O bus (i.e., specifically, SCSI or USB I/O buses).

If the user does not have a suitable specific hardware, the user is informed that the specific hardware is not suitable, and the I/O configuration application is forced to exit. This abnormal termination of the I/O configuration application causes the typical installation procedure 70 to abort the installation of all components as performed in step 93, hereafter defined in detail.

If the user system does have the specified hardware configuration (i.e., including but not limited to, SCSI or USB I/O buses), then the typical installation procedure 70 continues processing until the last item in the task manager's task list is accessed. Once the task manager has installed all components, the last item in the task manager's list is the I/O configuration component that runs again to display a dialog box telling the user which I/O port to connect their specified hardware device. This dialog is the second to last dialog displayed so that the user will remember which I/O port to use when they turn their PC off. The last dialog box is the one telling the user to shut down their PC and connect their specified hardware device to the I/O port identified above.

In an alternative embodiment, the I/O component is added automatically when the user installs some proprietary software. The I/O configuration component is added as the first and the last component on the component list because it is desirable that the typical installation procedure 70 checks to make sure that the user system has the specified hardware device prior to installing the desired application and communicates to the user the connection information for the specified hardware device as late as possible.

If the I/O configuration flag is not set in the check at step 91 or after the I/O configuration component is added in step 92, then the typical installation procedure 70 then initializes the installed recovery procedure at step 93. An example of an installation recovery system is further described in more detail in the commonly assigned and copending U.S. Patent Application entitled "Apparatus and Method for an Installation Recovery System," Ser. No. 09/170,504, filed on Oct. 13, 1998, herein incorporated by reference.

After the initialization of the installation recovery system at step 92, the typical installation procedure 70 executes the task manager component that installs, at step 93, all the components in the task manager's list of tasks built in steps 81 through 85.

After the typical installation process 93 is complete, the typical installation procedure 70 cleans up and de-installs all the changes that were implemented during the initialization and execution of the installation recovery system at step 95. The recoverable resource data link library is deleted at step 95.

The typical installation procedure 70 can execute a link manager system (i.e. Shortcut Link Creation) at step 96. An example of a link manager system is described in the commonly assigned and copending U.S. Patent Application entitled "Apparatus and Method for a Shortcut Link Creation System in a Computer System," Ser. No. 09/170,507, filed on Oct. 18, 1998, herein incorporated by reference. The typical installation procedure 70 then returns to step 54 within FIG. 2.

Figure 4:
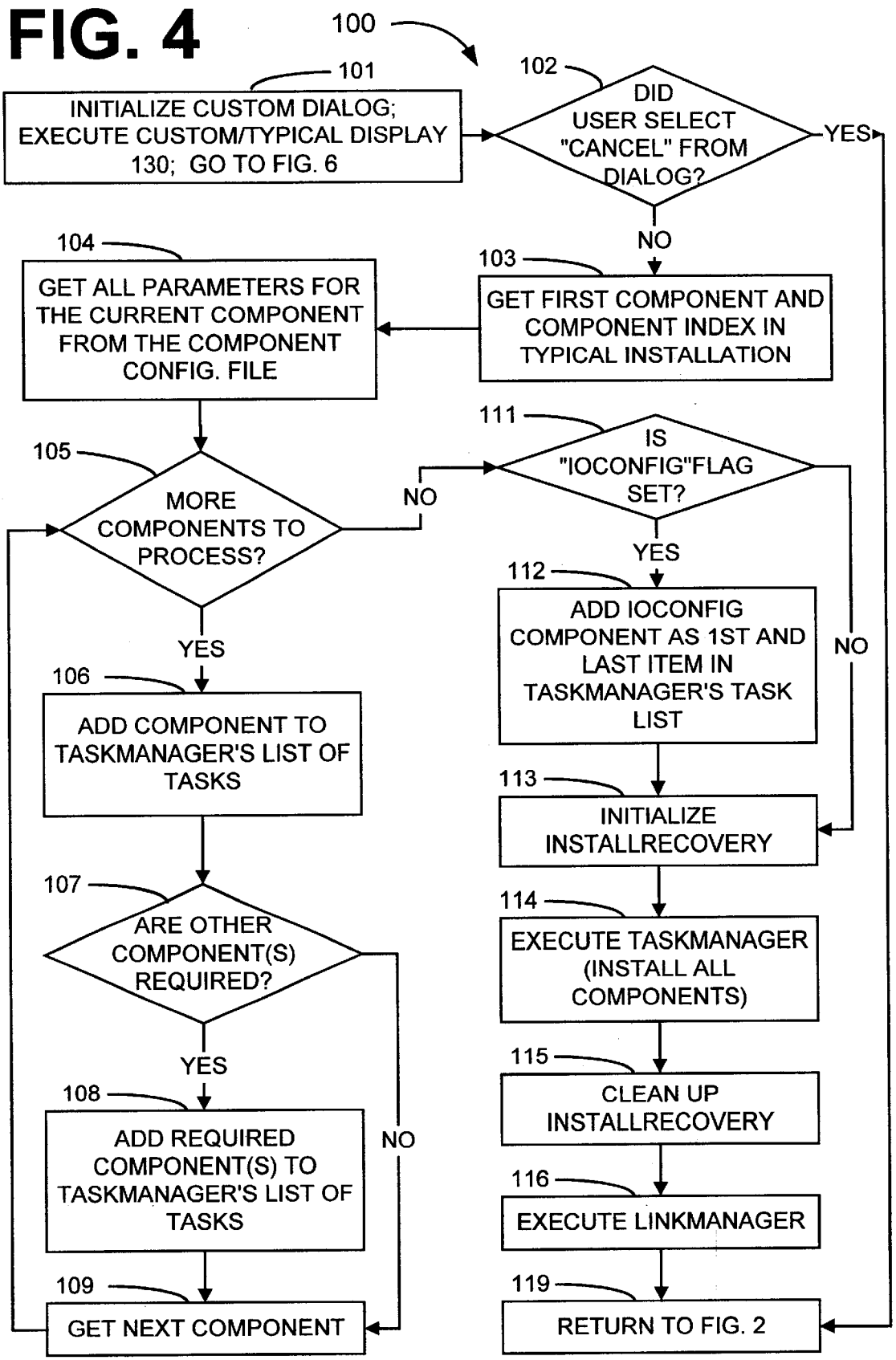
FIG. 4 is a flow chart of the custom installation process performed by the install system of the present invention, as shown in FIG. 1.

Illustrated in FIG. 4 is the flow diagram of the custom installation process 100 for the install system 50 referenced in FIG. 2. The custom installation process 100 is initialized at step 101, and executes the custom/typical installation data interaction dialog 130 with the user. The custom/typical installation data interaction dialog 130 is herein defined in detail with regard to FIG. 6. The custom installation process 100 then determines whether the user has selected the cancel entry from the interaction dialog box at step 102. If the user has selected the cancel custom installation process 100 in the dialog box at step 102, then the custom installation process 100 jumps to step 119 to return to FIG. 2 at step 56.

If the user has not selected cancel from the dialog at step 102, the custom installation process 100 retrieves the first component and component index in the typical installation of the particular third party application at step 103. The custom installation process 100 next retrieves all of the parameters from the component configuration file at step 104.

Next, custom installation process 100 determines whether the component configuration file path has more components to process (i.e., is path empty?) at step 105. If there are more components to process, then the custom installation process 100 adds the current component to the task manager's list of tasks to be performed at step 106.

After adding the current component at step 106, the custom installation process 100 determines whether the current component requires the installation of a mandatory component(s) for operation. In the preferred embodiment, the custom installation process 100 determines whether a mandatory component flag is set. If the current component does not require the installation of a mandatory component(s) for operation, the custom installation process 100 proceeds to step 109 to acquire the next component. If the current component requires the installation of a mandatory component(s) for operation, then the custom installation process 100 adds the mandatory component(s) to the task manager's list of tasks to be performed at step 108.

The custom installation process 100 acquires the next component at step 109, makes the next component the current component and loops to step 105 to repeat the previously mentioned steps. If there are no more components to process at step 105, then the custom installation process 100 determines whether the I/O configuration flag is set at step 111.

If the I/O configuration flag is set at step 111, the custom installation process 100 adds the I/O configuration component as the first and last item in the task manager's task list at step 112. The I/O configuration application checks the user system for the specified hardware device and has been previously defined with regard to steps 91 and 92 in FIG. 3.

After the completion of adding the I/O configuration component as he first and last item in the task manager's task list at step 112 or if the IO configuration flag is not set at the time the test is completed at step 111, the installation recovery process is initialized at step 113.

The installation recovery process has been discussed previously with regard to step 93 of FIG. 3 and operates as previously defined. The custom installation process 100 executes the task manager which performs the installation, at step 114, of all components selected during the custom/typical installation data interaction dialog process 130.

After the completion of the task manager installation, the install system de-installs, at step 115, the changes implemented during the initialization of the installation recovery process at step 113.

The custom installation process 100 then executes the link manager to link all of the installed components for the third party application at step 116 and then returns to step 56 at step 119. The link manager system has been discussed previously with regard to step 96 of FIG. 3 and operates as previously defined.

Figure 5:
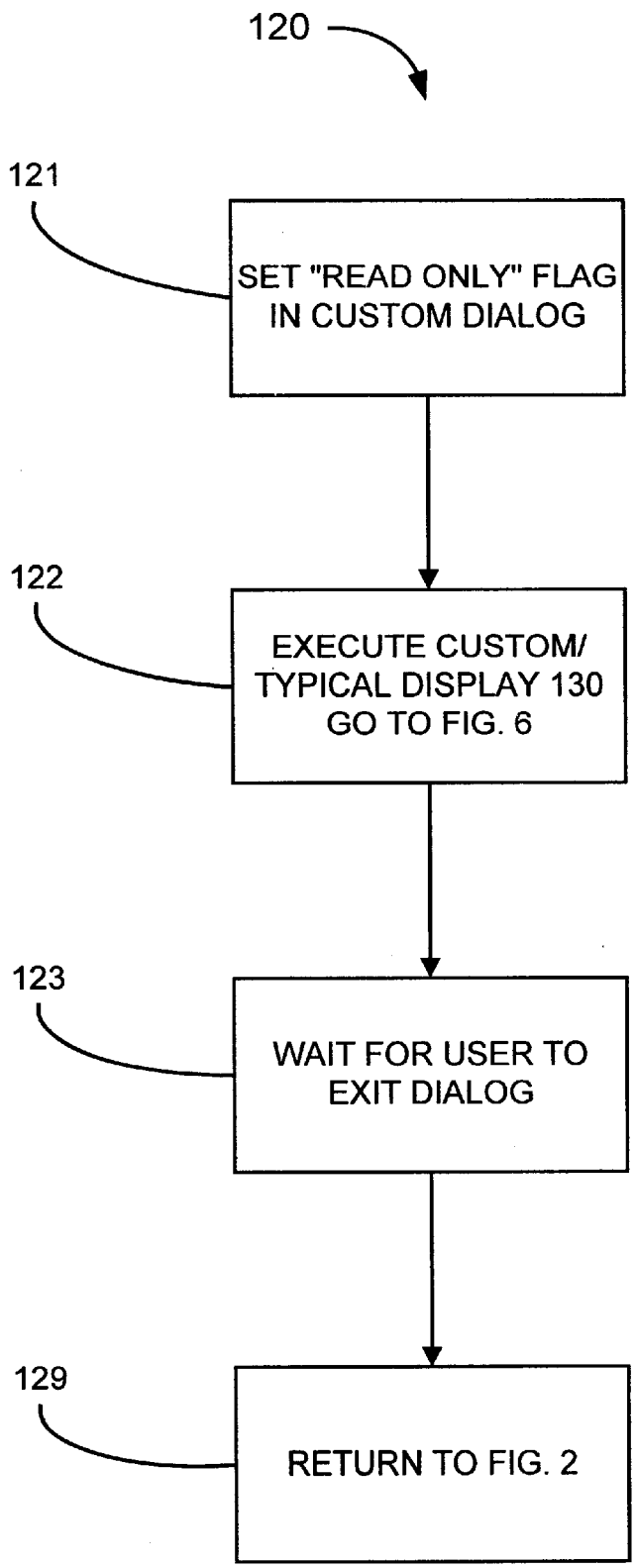
FIG. 5 is a flow chart of the review of the typical installation components selected for installation by the install system of the present invention, as shown in FIG. 1.

Illustrated in FIG. 5 is the flow diagram of the typical installation viewing process 120 for the install system 50 referenced in FIG. 2. The typical installation viewing process sets the "read only" flag in the custom dialog at step 121 and executes the custom/typical installation data interaction dialog 130 with the user at step 122. The custom/typical installation data interaction dialog 130 is herein defined in detail with regard to FIG. 6. The typical installation viewing process 120 then waits for the user to exit the custom/typical data interaction dialog 130 at step 123 and returns to step 62 of FIG. 2 at step 129, upon the completion of the custom/typical data interaction dialog 130 with the user.

Figure 6:
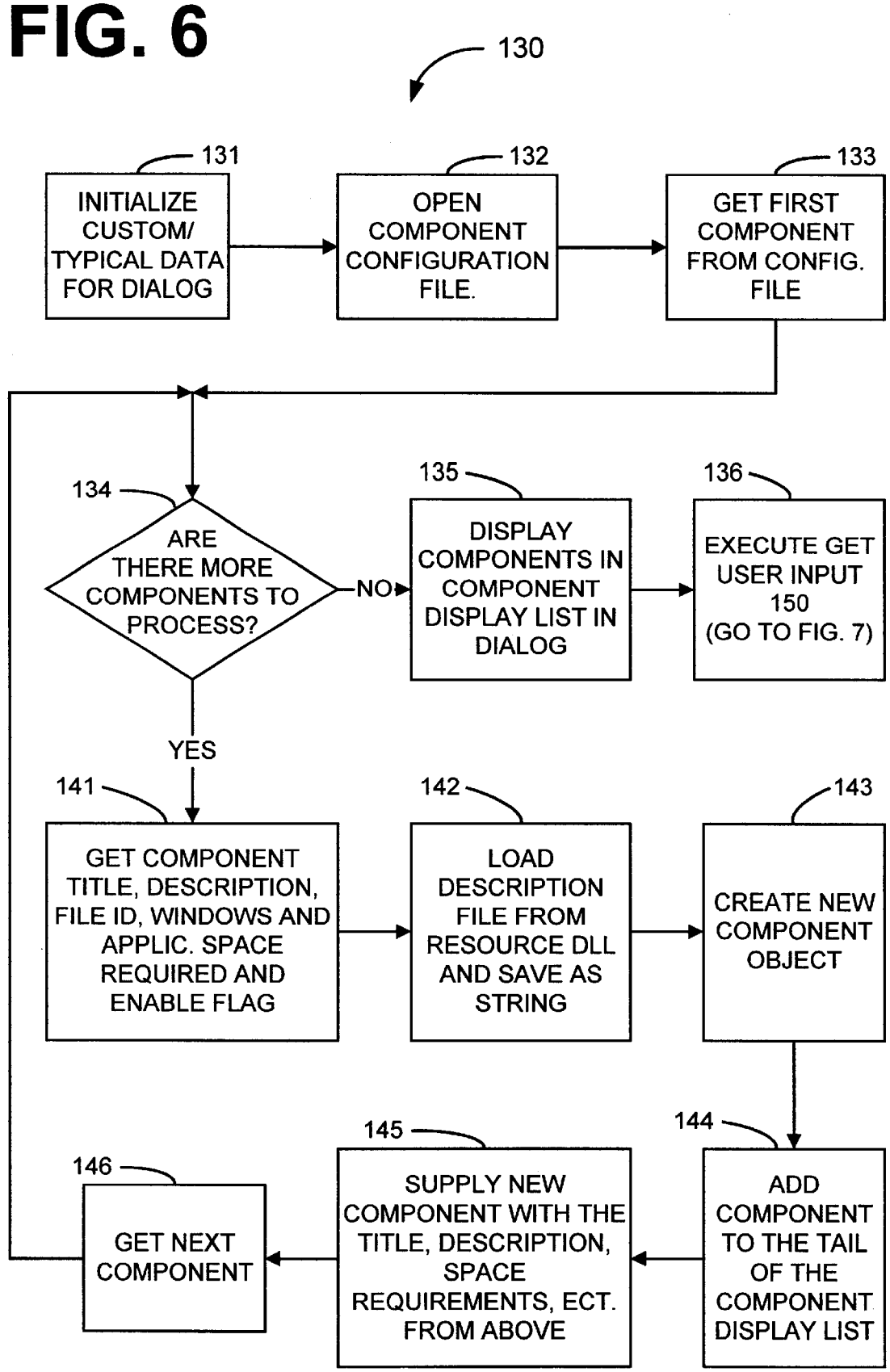
FIG. 6 is a flow chart of the custom dialog and display routine for custom/typical third party application installation performed by the install system of the present invention, as shown in FIG. 5.

Illustrated in FIG. 6 is the custom/typical data interaction user dialog 130 for the install system 50 referenced in FIGS.

4 and 5. The custom/typical data interaction dialog 130 is first initialized at step 131. The custom/typical data interaction dialog 130 opens the component configuration file at step 132 and gets the first component from that configuration file at step 133. The custom/typical data interaction dialog 130 tests if there are more components to process at step 134.

If there are more components to process at step 134, then the custom/typical data interaction dialog 130 gets the component title, the description file ID, the window space requirements, the application space requirements, and the enablement flag for the current component. Next, the custom/typical data interaction dialog 130 loads the description file from the resource dynamic link library and saves the description file information as a string at step 142.

The custom/typical data interaction dialog 130 then creates a new component object at step 145 and adds the current component to the tail of the component display list at step 144. The custom/typical data interaction dialog 130 supplies the new component with the title description space requirements, etc. from the request at step 141 above.

After supplying the new component with the title, description, space requirement, etc. at step 145, the custom/typical data interaction dialog 130 gets the next component from the component configuration file at step 146, makes the new component the current component, and loops back to step 134 to test if there are more components to process.

If there are no more components to process at step 134, the custom/typical data interaction dialog 130 then proceeds to display the components in the component display list in the dialog at step 135. The dialog displays to the user in a dialog message the title, description, window space, application space requirements and enablement flag for each component in the component display list. Next, the custom/typical data interaction dialog 130 executes the get user input 150 at step 136, herein defined in detail with regard to FIG. 7.

Figure 7:
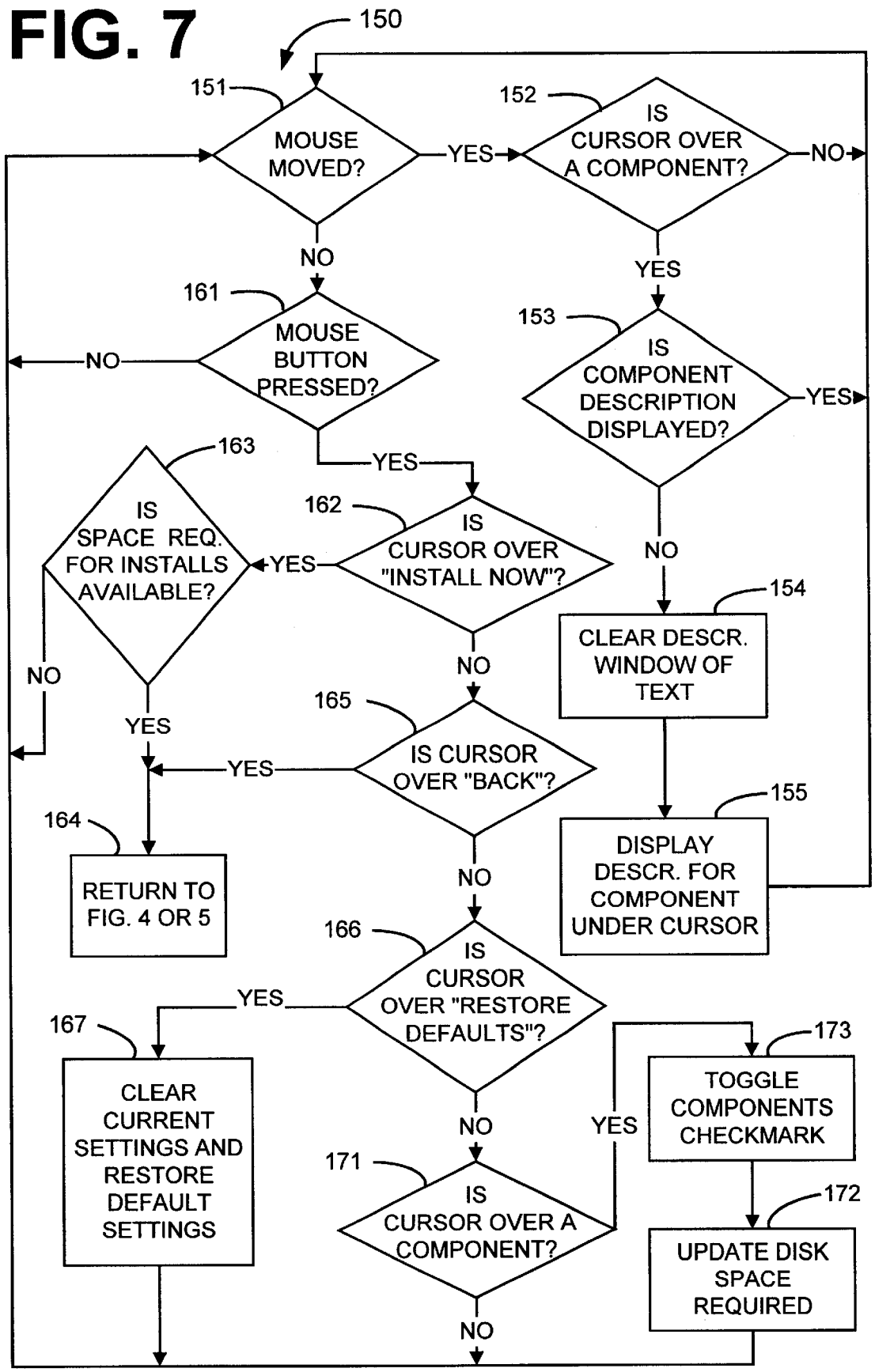
FIG. 7 is a flow chart of the get user input routine performed by the install system of the present invention, as shown in FIG. 6.

Illustrated in FIG. 7 is the get user input process 150 for the custom/typical data interaction user dialog 130 referenced in FIG. 6. The user input process 150 first determines whether the mouse has moved or if data has been input via keyboard touch screen, digital TAB or other user data input device at step 151. If the mouse has moved or data has been input at step 151, the user input process 150 then checks if the cursor or data input is over a component in the component display list displayed to the user in a dialog message. If the cursor or data input is not over a component at step 152, the user input process 150 then loops back to step 151 looking for any more user input.

If the data input or mouse movement is with regard to a component as determined at step 152, the user input process 150 then determines whether a component description is currently being displayed to the user in a dialog message at step 153. If the component description is currently being displayed, the user input process 150 then returns to step 151 looking for more input from the user.

If the component with regard to the cursor movement or data input is not the component description currently being displayed at step 153, then the user input process 150 clears the description window of any existing text at step 154 and displays the description for the component under the cursor or indicated with the data input at step 155. Once the display of the component description has been performed at step 155, the user input process 150 returns to step 151 looking for more cursor or data input.

If the mouse has not moved or no data has been input at step 151, then the user input process 150 determines whether the left mouse button has been pressed at step 161. If the mouse button has not been pressed, then the user input process 150 returns to step 151 looking for the mouse to move or data input. However, if the left mouse button is detected as being depressed at step 161, the user input process 150 then checks if the cursor is over the install-now command within the custom/typical interface dialog at step 162.

If the cursor or data input is for the install-now command at step 162, then the user input process 150 determines whether sufficient storage space is available for the selected components to be installed at step 163. The user input process 150 retrieves the figures for all available disk space from all drives on the computer system 12 and saves the total amount of available disk space. The user input process 150 acquires the amount of space required for all selected components to be installed (as accumulated in step 172). The user input process 150 uses the total amount of available disk space and the space required for all selected components to determine whether sufficient storage space is available for the selected third party applications' components to be installed. The user input process 150 displays a message if the user input process 150 determines at step 163 that the total amount of available disk space is less than the space required for the selected third party applications components to be installed and returns to step 151.

If it is determined at step 163 that the total amount of available disk space is more than the space required to install the selected third party applications components, then the user input process 150 proceeds to step 164 that returns the user to FIGS. 4 or 5 for continued processing, as herein defined above.

If the cursor or data input is not with regard to the install-now command at step 162, then the user input process 150 checks if the cursor or data input is with regard to the back command at step 165. If the cursor or data input is with regard to the back command, the user input process 150 proceeds to step 164 that returns the user to FIGS. 4 or 5 for continued processing, as herein defined above.

When the cursor or data input is not with regard to the back command at step 165, the user input process 150 then determines whether the cursor or data input is with regard to the restore defaults command at step 166. If the cursor or data input is with regard to the restore defaults command, the user input process 150 then clears the current settings and restores the default settings at step 167 and returns to step 151 waiting on mouse to move or other data to be input. In the preferred embodiment, the user input process 150 utilizes the components listed in the configuration file to restore the default settings at step 167. In an alternative embodiment, the user input process 150 utilizes the components listed in a predetermined file to restore the default settings at step 167.

When the cursor or data input is not with regard to the restore defaults command at step 166, the user input process 150 then determines whether the cursor or data input is over a component in the component display list displayed to the user in a dialog message at step 171. If the cursor or data input is not with regard to such a component, then the user input process 150 returns again to step 151 waiting on mouse to more or other data to be input.

If the cursor or data input is with regard to a component in the component display list displayed to the user in a dialog message at step 171, the user input process 150 then toggles the component's check mark at step 172 and updates the required disk space at step 173. The user input process 150, upon the updating of the disk space required, then returns again to step 151 to wait for more input.

The install system for typical/custom installation of third party applications comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A universal third party application install apparatus on a computer system, said install apparatus comprising:
    a means for selecting a plurality of components in a plurality of third party applications to be installed; and
    a means for installing the selected plurality of components.

2. The apparatus of claim 1, further comprising:
    means for detecting if sufficient storage space is available for said plurality of components to be installed, wherein said detecting means calculates a total amount of available disk space available from all available disk drives on the computer system, and calculates space required for said plurality of components to be installed.

3. The apparatus of claim 1, wherein said selecting components means further comprising:
    means for selecting a predetermined set of said plurality of components to be installed.

4. The apparatus of claim 1, wherein said selecting components means further comprising:
    means for allowing an user to select one of said plurality of components to be installed.

5. The apparatus of claim 4, wherein said allowing an user to select one of said plurality of components means further comprising:
    means for providing a list of said plurality of components to allow said user to select any one of said plurality of components to be installed.

6. The apparatus of claim 1, further comprising:
    means for displaying component information on any one of said plurality of components.

7. A method for installing a universal third party application software on a computer system, said method comprising the steps of:
    selecting a plurality of components in a plurality of third party applications to be installed; and
    installing the selected plurality of components.

8. The method of claim 7, further comprises the step of:
    detecting if sufficient storage space is available for said plurality of components to be installed, wherein said detecting step further comprises the steps of:
        calculating a total amount of available disk space available from all available disk drives on the computer system; and
        calculating space required for said plurality of components to be installed.

9. The method of claim 7, wherein said selecting components step further comprises the step of:
    selecting a predetermined set of said plurality of components to be installed.

10. The method of claim 7, wherein said selecting components step further comprises the step of:
    allowing an user to select one of said plurality of components to be installed.

11. The method of claim 10, wherein said allowing an user to select one of said plurality of components step further comprises the step of:
    providing a list of said plurality of components to allow said user to select any one of said plurality of components to be installed.

12. The method of claim 7, further comprising the step of:
    displaying component information on any one of said plurality of components.

13. A universal third party application install apparatus on a computer system, said install apparatus comprising:
    logic configured to select a plurality of components in a plurality of third party applications to be installed; and
    logic configured to install the selected plurality of components in said plurality of third party applications.

14. The apparatus of claim 13, further comprising:
    logic configured to detect if sufficient storage space is available for said plurality of components to be installed;
    logic configured to calculate a total amount of available disk space available from all available disk drives on the computer system; and
    logic configured to calculate a total amount of space required for said plurality of components to be installed.

15. The apparatus of claim 13, further comprising:

logic configured to select a predetermined set of said plurality of components to be installed; and logic configured to allow an user to select one of said plurality of components from a list of said plurality of components to be installed.

16. The apparatus of claim 13, further comprising:

logic configured to display component information on any one of said plurality of components.

17. The apparatus of claim 6, wherein said displaying component information means further comprises:

means for displaying component size information on any one of said plurality of components.

18. The method of claim 12, further comprises the step of:

displaying component size information on any one of said plurality of components.

19. The apparatus of claim 16, wherein said displaying component information logic further comprises:

logic configured to display component size information on any one of said plurality of components.

\* \* \* \* \*